(12) United States Patent
Milliron et al.

(10) Patent No.: US 10,176,026 B2
(45) Date of Patent: Jan. 8, 2019

(54) SYSTEM AND METHOD FOR TAGGING AND TRACKING EVENTS OF AN APPLICATION

(71) Applicant: Twilio, Inc., San Francisco, CA (US)

(72) Inventors: Timothy S. Milliron, San Franciso, CA (US); Adam Ballai, San Francisco, CA (US); Robert Hagemann, San Francisco, CA (US)

(73) Assignee: Twilio, Inc., San Francisco, CA (US)

( * ) Notice: Subject to any disclaimer, the term of this patent is extended or adjusted under 35 U.S.C. 154(b) by 0 days.

(21) Appl. No.: 15/926,381

(22) Filed: Mar. 20, 2018

(65) Prior Publication Data

US 2018/0210769 A1 Jul. 26, 2018

Related U.S. Application Data

(63) Continuation of application No. 15/719,860, filed on Sep. 29, 2017, now Pat. No. 9,959,151, which is a continuation of application No. 15/002,774, filed on Jan. 21, 2016, now Pat. No. 9,811,398, which is a continuation of application No. 14/489,387, filed on Sep. 17, 2014, now Pat. No. 9,274,858.

(60) Provisional application No. 61/879,035, filed on Sep. 17, 2013.

(51) Int. Cl.
*G06F 9/54* (2006.01)
*G06F 11/30* (2006.01)
*G06F 9/46* (2006.01)

(52) U.S. Cl.
CPC .............. *G06F 9/542* (2013.01); *G06F 9/466* (2013.01); *G06F 11/3065* (2013.01); *G06F 11/3089* (2013.01); *G06F 2201/86* (2013.01); *G06F 2201/88* (2013.01)

(58) Field of Classification Search
None
See application file for complete search history.

(56) References Cited

U.S. PATENT DOCUMENTS

| | | | | |
|---|---|---|---|---|
| 5,333,302 | A * | 7/1994 | Hensley | G06F 11/3414 703/22 |
| 7,500,249 | B2 * | 3/2009 | Kampe | G06F 9/542 719/318 |
| 2012/0101952 | A1 * | 4/2012 | Raleigh | G06Q 30/016 705/304 |

* cited by examiner

*Primary Examiner* — Craig C Dorais
(74) *Attorney, Agent, or Firm* — Schwegman Lundberg & Woessner, P.A.

(57) ABSTRACT

A system and method for providing delegated metric tools within a partially closed communication platform that includes receiving a tag identifier linked to at least a first identified platform interaction in the communication platform; associating the tag identifier with at least one logged event of an account associated with the first identified platform interaction; defining a tracking resource with at least one tag identifier; measuring platform interactions tracked by a tracking resource; and providing access to measured platform interactions through an application.

18 Claims, 15 Drawing Sheets

| Category | Description |
|---|---|
| calls | All voice calls, inbound & outbound. Count is the number of calls and Usage is the number of minutes. |
| calls-inbound | All inbound voice calls, to both toll-free and local numbers. |
| calls-inbound-local | All inbound voice calls to local numbers. |
| calls-inbound-tollfree | All inbound voice calls to toll-free numbers. |
| calls-outbound | All outbound voice calls. |
| calls-client | All TwilioClient voice calls. |
| sms | All SMS messages, both inbound and outbound. Count and Usage are both the number of messages sent. |
| sms-inbound | All inbound SMS messages, to both short-codes and long-codes. |
| sms-inbound-shortcode | All inbound SMS messages to short-codes. |
| sms-inbound-longcode | All inbound SMS messages to long-codes. |
| sms-outbound | All outbound SMS messages, from both short-codes and long-codes. |
| sms-outbound-shortcode | All outbound SMS messages from short-codes. |
| sms-outbound-longcode | All outbound SMS messages from long-codes. |
| phonenumbers | All phone numbers owned by the account, toll-free and local. |
| phonenumbers-tollfree | All toll-free phone numbers owned by the account. |
| phonenumbers-local | All local phone numbers owned by the account. |
| shortcodes | All short-codes owned by the account, of all types. |
| shortcodes-vanity | All vanity short-codes owned by the account. |
| shortcodes-random | All randomly-assigned short-codes owned by the account. |
| shortcodes-customerowned | All short-codes owned by the account that are leased from another provider. |
| calleridlookups | CallerID (CallerName) lookups. |
| recordings | Recordings of voice calls. Count is the number of recordings and Usage is the number of recorded minutes. Note that Twilio doesn't charge for making recordings (only storing them long term) so Price will always be 0. |
| transcriptions | Transcriptions of voice calls. Count is the number of transcriptions and Usage is the number of transcribed minutes. |
| recordingstorage | Amount of storage used by call recordings stored for the account. Count is the number of stored recordings, Usage is the number of stored recorded minutes, and Price is the price of storing the recordings. |
| totalprice | Total price of all usage. Usage will be the same as Price, and Count will be empty. Note that some Twilio costs may not be included in any usage category, so the sum of all usages may or may not be equal to the Price of TotalPrice. |

FIGURE 3

```
<AutoTag>
    <Rules>
        <Geography>US</Geography>
        <Type>Mobile</Type>
    </Rules>
    <Tag>HighQuality</Tag>
</AutoTag>
```

FIGURE 12

```
<Tracker>
    <Tags>
        <Tag>Foo</Tag>
        <Tag>Bar</Tag>
    </Tags>
</Tracker>
```

FIGURE 13A

```
//(Foo or Bar) & Customer & not Survey
<Tracker>
    <Tags>
        <Tag>Foo, Bar</Tag>
        <Tag>Customer</Tag>
        <Tag>!Survey</Tag>
    </Tags>
</Tracker>
```

FIGURE 13B

```
<Tracker>
    <Tags>
        <Tag>Foo</Tag>
        <Tag>Bar</Tag>
    </Tags>
    <Measure type="average">QualityScore</Measure>
</Tracker>
```

FIGURE 13C

SYSTEM AND METHOD FOR TAGGING AND TRACKING EVENTS OF AN APPLICATION

CROSS-REFERENCE TO RELATED APPLICATIONS

This application is a continuation of U.S. patent application Ser. No. 15/719,860, filed 29 Sep. 2017, which is a continuation of U.S. patent application Ser. No. 15/002,774, which is a continuation of U.S. patent application Ser. No. 14/489,387, filed 17 Sep. 2014, which claims the benefit of U.S. Provisional Application Ser. No. 61/879,035, filed on 17 Sep. 2013, both of which are incorporated in their entirety by this reference.

TECHNICAL FIELD

This invention relates generally to the application platform field, and more specifically to a new and useful system and method for tagging and tracking events of an application platform in the application platform field.

BACKGROUND

In application platforms, developers using the platform often want to be able to detect when particular events occur. To do so, many developers develop polling systems to detect when an event occurs. Building such a system can be time consuming and difficult to maintain. Furthermore, some events of the application platform may not be exposed through an API or other programmatic interface. The application platform may have logistical reasons, security reasons, or business reasons for not exposing all internal events to third party developers. Thus, for some events, developers may not be able to detect the event. Thus, there is a need in the application platform field to create a new and useful system and method for triggering on platform usage. This invention provides such a new and useful system and method.

BRIEF DESCRIPTION OF THE FIGURES

FIG. 3 is a table of exemplary usage counters of a preferred embodiment;

FIG. 12 is a exemplary auto-tagging rule configuration;

FIGS. 13A, 13B, and 13C are exemplary tracker resource configurations;

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for Triggering on Platform Usage

Figure 1:
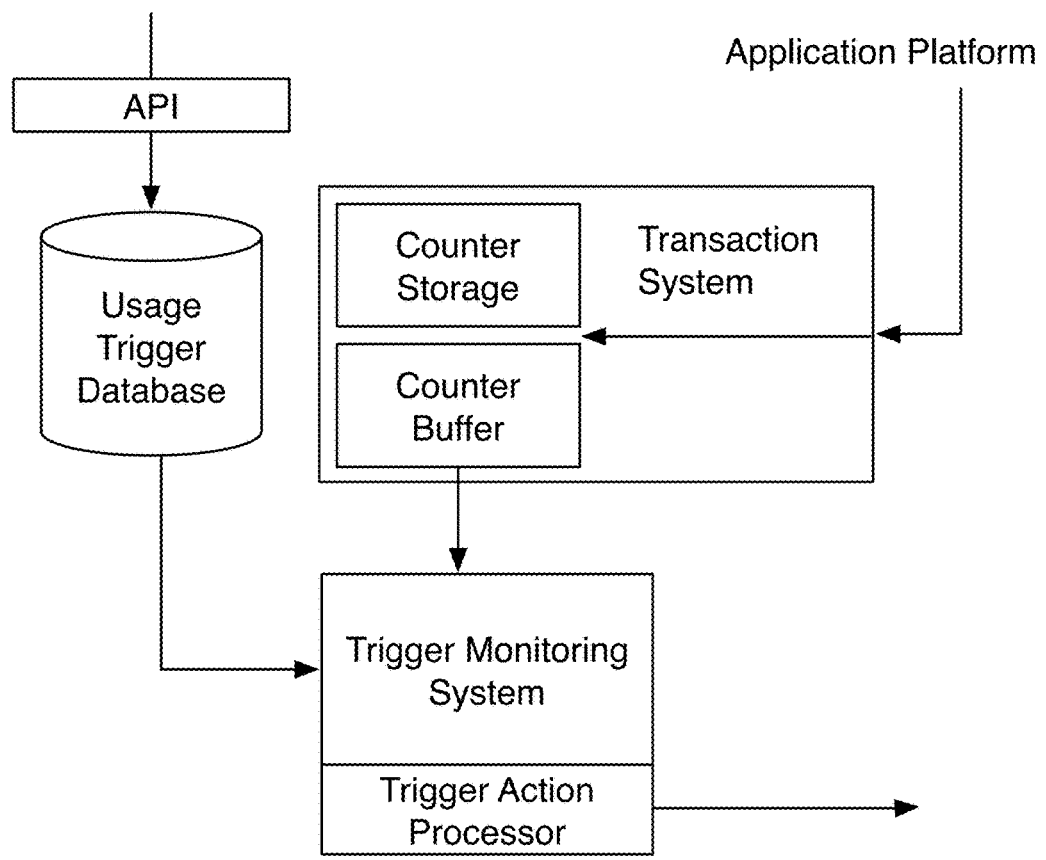
FIG. 1 is a schematic representation of a system of a preferred embodiment of the invention.
Figure 2:
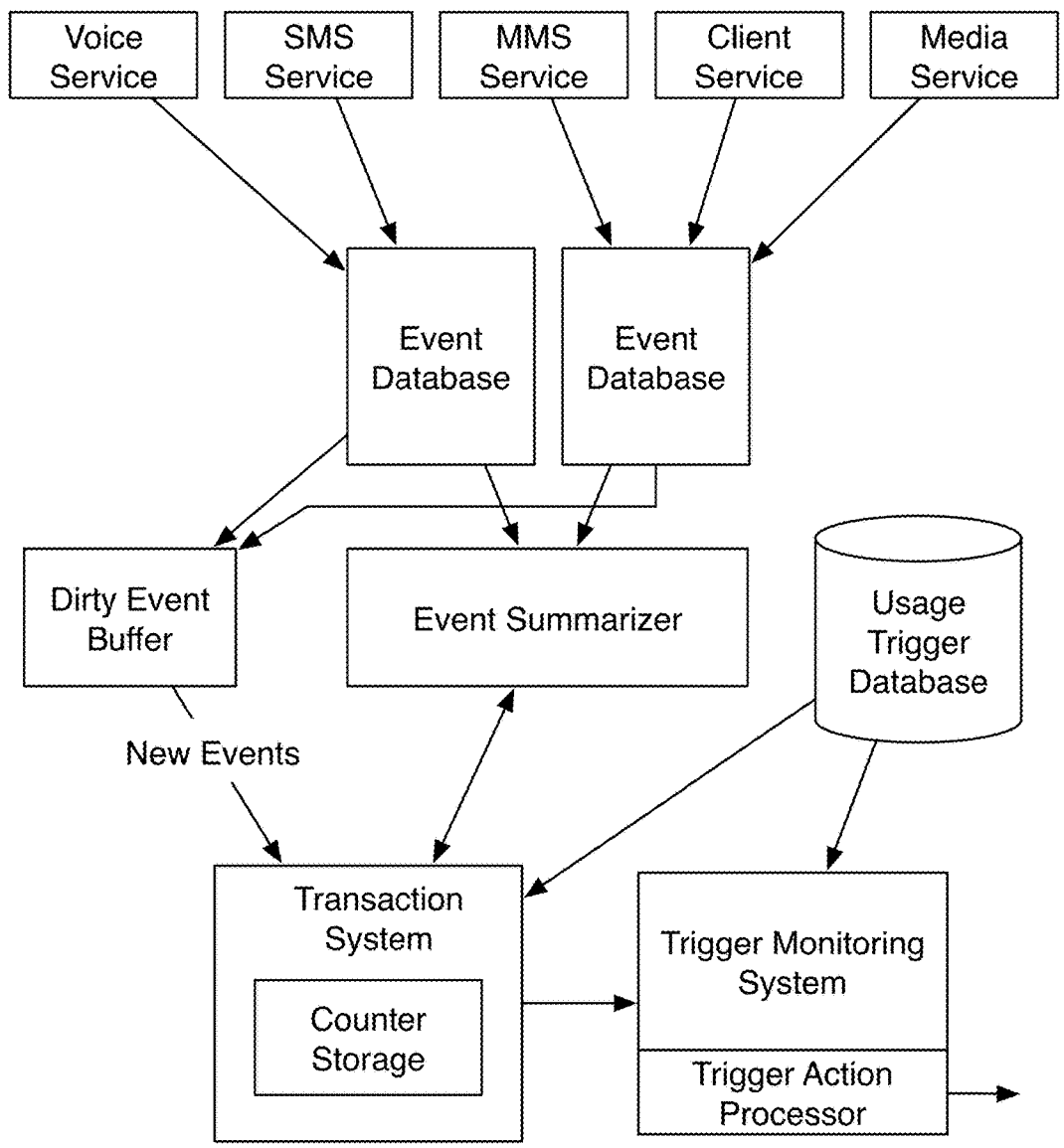
FIG. 2 is an schematic representation of an variation of the system of a preferred embodiment.

As shown in FIGS. 1 and 2, a system for triggering on platform usage of a preferred embodiment can include a transaction system, usage trigger database, a trigger monitoring system, and a trigger action processor. The system functions to create a simple interface for outside applications to deploy usage based events within a closed platform. An interface to the system preferably enables a user/developer to generate a new usage trigger for an application or service platform. During operation of the application platform, the system can update and monitor the status of various event counters. When a particular counter satisfies a usage trigger, actions corresponding to the usage trigger can be performed. The system can preferably achieve improved efficiency and provide a wider range of trigger options, compared to an event polling system from an outside developer, when the usage triggers are integrated into the operation of the application platform. Furthermore, the system can accommodate the application of an account holder being separate from the application platform by at least one security layer. The system can be used for general usage and event tracking of internal processing of the application platform, but the system can similarly be used for asynchronous error and warning handling.

The system is preferably implemented alongside an application platform. Preferably, the application platform is a multitenant, distributed computing system providing an HTTP-based application programming interface (API). The application platform may alternatively be any suitable platform. The application platform preferably provides a service used by outside applications or devices. In one preferred variation, the application platform preferably provides a usage-based API service. In one variation, the usage-based API service enables use of communication channels such as the telephony application platform described in patent application Ser. No. 12/417,630 filed 2 Apr. 2009, entitled "System and Method for Processing Telephony Sessions", which is hereby incorporated in its entirety by this reference. A telephony or communication application platform can enable synchronous communication sessions such as voice sessions, video sessions, screen sharing sessions, or any suitable synchronous form of media communication. The communication can be carried out over PSTN channels, SIP channels, IP-based channels, WebRTC, or any suitable communication protocol. The communication application platform can similarly facilitate asynchronous communication such as SMS, MMS, IP-based client application messaging, proprietary platform messaging (e.g., social network messaging), or any suitable form of asynchronous communication. The application platform may alternatively provide any suitable service. The system is preferably integrated within an application platform. Alternatively, the system may serve as a standalone service and may include an interface to enable at least one application platform or applications to generate events, toggle counters, generate usage triggers, perform responses for a usage trigger, and/or interact with the system in any suitable manner.

The application platform is preferably a multitenant platform with multiple accounts using the platform to supplement operation of external applications. The application platform is a different system from the external applications, and mode of interaction and the security between the application platform and the application of an account can characterize that separation. As with the telephony application platform described above, the application platform can include characteristics of operating according to responses of an outside developer application. In some instances, the application platform submits requests to the client application, and the application platform will perform a service according to the response. Such a model can be common in communication-based service platforms where the service platform provides significant infrastructure to handle incoming calls. The application platform acts as infrastructure delegate for a particular service. In some instances, the application platform will post data to the application server (e.g., an HTTP POST). In the telephony application platform, the platform detects external events such as an incoming telephone calls. In response to a call associated with an account, the application platform requests direction from an application server of the account. The application server can be hosted and operated by an outside party independent of the telephony platform. From the perspective of the application server, the telephony application platform is a type of client device (e.g., a browser session). However, unlike a user controlled client device, customized client-side code cannot be created and installed on the client side. Such client-side custom browser code can be used by a developer to catch and responsively relay suitable data to the application server, but that option may not exist in such an application platform. Within the telephony application platform, application instructions are executed and managed according to the platform infrastructure and logic. In the case of a telephony application platform, considerable infrastructure and services are required to provide the calling services. Logistically, the complexity of the system can be a barrier to allow customer customization (i.e., customization by outside application developers). Unlike a system where an application server communicates with a developer-implemented client application, the developer cannot modify the platform components beyond the interfaces exposed by the application platform. Additionally or alternatively, even when customization would be feasible privacy issues, business strategy, and security issues can pose other barriers that the system functions to support.

At least one security layer can additionally exist between the application platform and an external application. The application platform can depend on application API requests to include account authentication information. An application server can additionally include security to protect access by entities external to the respective application system. In particular, the resources referenced by a callback URI can be secured through an authentication layer, a certificate verification layer, an IP whitelist/blacklist, or any suitable form of security.

A transaction system of a preferred embodiment functions to increment counters of application platform events. The transaction system is preferably coupled to an application platform. The transaction system is preferably integrated into the operation of the application platform. A variety of different services and resources of an application platform can be configured to notify the transaction system of events, usage updates, errors, warnings, or any suitable usage event of the application platform. The transaction system can log individual platform events. In some variations, a sub-set of the stored platform events can be queried and accessed through a platform API or user interface. Another sub-set of stored platform events could be internal and include private event information. The internal platform events can contain private information. The internal platform events can be used in combination to initiate a usage trigger. In the case of the telephony application platform, call routers, SMS services, MMS severs, video servers, client servers, SIP servers, and other suitable components can send event information for individual storage. The transaction system preferably includes counter storage and a counter buffer. The counter storage and buffer preferably store the count of particular types of events and facilitate triggering when a counter reaches usage trigger threshold. In some situations, the transaction system can include a summarizer which functions to process individual event logs and appropriately store a new counter or update an existing counter in the counter storage.

A counter storage module can function as a log of transaction history of an application platform. The counter storage preferably stores a plurality of counters. The counter storage is preferably a database but may be any suitable system for storing counter data. The counters may be tied to a particular account, subaccounts, and/or any suitable entity. The counters preferably include a parameter indicating the number of occurrences or instances for a particular application platform event of the application platform. Since counters can exist for a variety of different types of information within a system and may have different configuration requirements (e.g., time periods, update frequency, etc.), counters can be created by an account. A counter can be created through an API or user interface. In one implementation, a REST API is used to create a usage trigger by posting trigger customization parameters to a platform URI resource of "/usage/trigger/" with daily counter parameter of 365 and hourly counter parameter of 24, and event pattern of a block of particular area codes. In some cases, maintaining a counter is associated with some expense either for the application platform and/or the associated account. Accordingly, the system enables flexibility of creating counters without automatically counting every type of event for all accounts. In some cases, the system can include default counters that are created for particular types of events. Triggers stored in the usage trigger database can preferably be attached or associated with a particular counter. As shown in FIG. 3, some exemplary counters may include calls, inbound or outbound calls to a particular type of destination (local, toll free, specified country codes etc.), SMS/MMS messages, inbound or outbound SMS/MMS messages to a particular type of destination, phone number or endpoint allocation, subaccount creation, resource creation, recordings or media creation, storage space, price for all usage, billing information events, event locations, API calls, system errors and warnings, or any suitable form of usage counter. For example, a counter may be maintained for the number of calls made by a particular account on a telephony platform. A counter may alternatively or additionally include a parameter indicating any suitable metric of an event or entity, such as timing of events, frequency of events, properties of events, or any suitable metric.

A counter buffer can function as a temporary collection of counters that are awaiting analysis by the trigger monitoring system. The counter buffer can temporarily store newly incremented counters in the buffer. After the trigger monitoring system has processed a counter in the counter buffer, the counter can be deleted or removed from the buffer in a suitable manner. In an alternative configuration, the counter buffer can be replaced or function as a record of events yet to be counted. To avoid constantly updating counters, the counter buffer can store a pointer to stored events that should be processed into a counter. When a counter should be updated according to timing of a usage trigger, the summarizer or other suitable component processes unaccounted events into the counter. The system can use other alternative approaches to updating a counter such as recording a timestamp of last update and retrieving events after that timestamp when updating the counter.

The summarizer can function as a service to process individual event logs into counters. In some instances, a counter may be created for a class of events. Events sharing common properties can be counted together. For example, an event can be logged for every communication session established on behalf of the account. Those sessions can be directed at different destination endpoints or addresses. All of these events can be counted as a whole to measure total number of calls, but the summarizer can alternatively count one sub-set or multiple subsets of the events. Some events can additionally contribute to the count of multiple counters. For example, communication events directed at telephone numbers with a particular area code can be counted in a counter for that area code and with a total outbound call counter. The summarizer pattern matching can be rule based, use regular expressions, or use any suitable approach to detect patterns. The summarizer can additionally do fuzzy detection of groups to automatically detect events that match patterns of a group of events. In the case of error events, multiple events may be logged with the same error code; the summarizer can process an error report stored with the error events to further distinguish between the error events. For example, an error code could be caused by an internal error of the platform or by malformed instructions from an application server. The summarizer could process the error report and distinguish between these two types of errors based on natural language processing of the code or data leading up to the error.

A usage trigger database of a preferred embodiment functions to store resources characterizing how to monitor usage and actions to perform. The usage trigger database preferably stores a plurality of usage triggers. A usage trigger is preferably a data object characterizing when to trigger and at least one response action. The usage trigger is preferably set for a particular type of counter. Additionally, a trigger evaluation interval may be set such that the usage trigger will only constitute a trigger on a periodic basis (e.g., hourly, daily, monthly, one time, etc), for a particular event, and/or according to any suitable rule. Polling is one variation for implementing the trigger evaluation intervals. The usage trigger preferably additionally includes at least one parameter defining a response when the trigger is satisfied. One parameter could be a callback URI, where an HTTP response can be sent. The callback URI preferably references a web application controlled by the developer creating the usage trigger, and the web application may perform any suitable action the developer configures. The trigger monitoring system will preferably use the stored callback URI as a destination endpoint for a transmitted message with the counter status. Additionally or alternatively, the usage trigger may specify a particular application platform response. For example, in a telephony application platform, a call can be ended even if the call is in progress. Enabling counter based manipulation of an application can allow applications to respond to events that could otherwise not be possible by outside developers. Private data and platform functions can be performed on behalf of the developer in response to internal counters. Similarly, the platform response could include modifying an account, a communication session, application instance, or any suitable response. The usage triggers are preferably set for particular accounts or other groupings. The usage triggers in the usage trigger database can be keyed by application platform accounts or subaccounts or any suitable key. The usage triggers may alternatively be globally set.

A trigger monitoring system functions to monitor the counters in the context of the set usage triggers. The trigger monitoring system is preferably communicatively coupled to the counter buffer of the transaction system. The trigger monitoring system preferably reads recently updated counters from the counter buffer, compares counters to an associated usage trigger if one exists, initiates a response by the trigger action processor if required, and removes the counter from the counter buffer. The trigger monitoring system may alternatively retrieve counters from the transaction system in any suitable manner. If a particular counter does not have an associated usage trigger or the usage trigger evaluation interval doesn't call for processing, then the counter is simply removed from the buffer and no response is triggered.

A trigger action processor of a preferred embodiment functions to initialize or perform the response of an activated usage trigger. The trigger action processor is preferably a subprocess of the trigger monitoring system, but may alternatively be an independent module, at least a sub-portion of an integrated application platform, or any suitable component. As described above, the response of a usage trigger can include a callback URI. The trigger action processor will preferably make an HTTP request to the callback URI when a usage trigger is processed. The HTTP request may include parameters associated with the usage trigger and/or the counter. Additionally or alternatively, the trigger action processor may use a component to access an API of an application platform to perform a designated action specified in the usage trigger.

Figure 4:
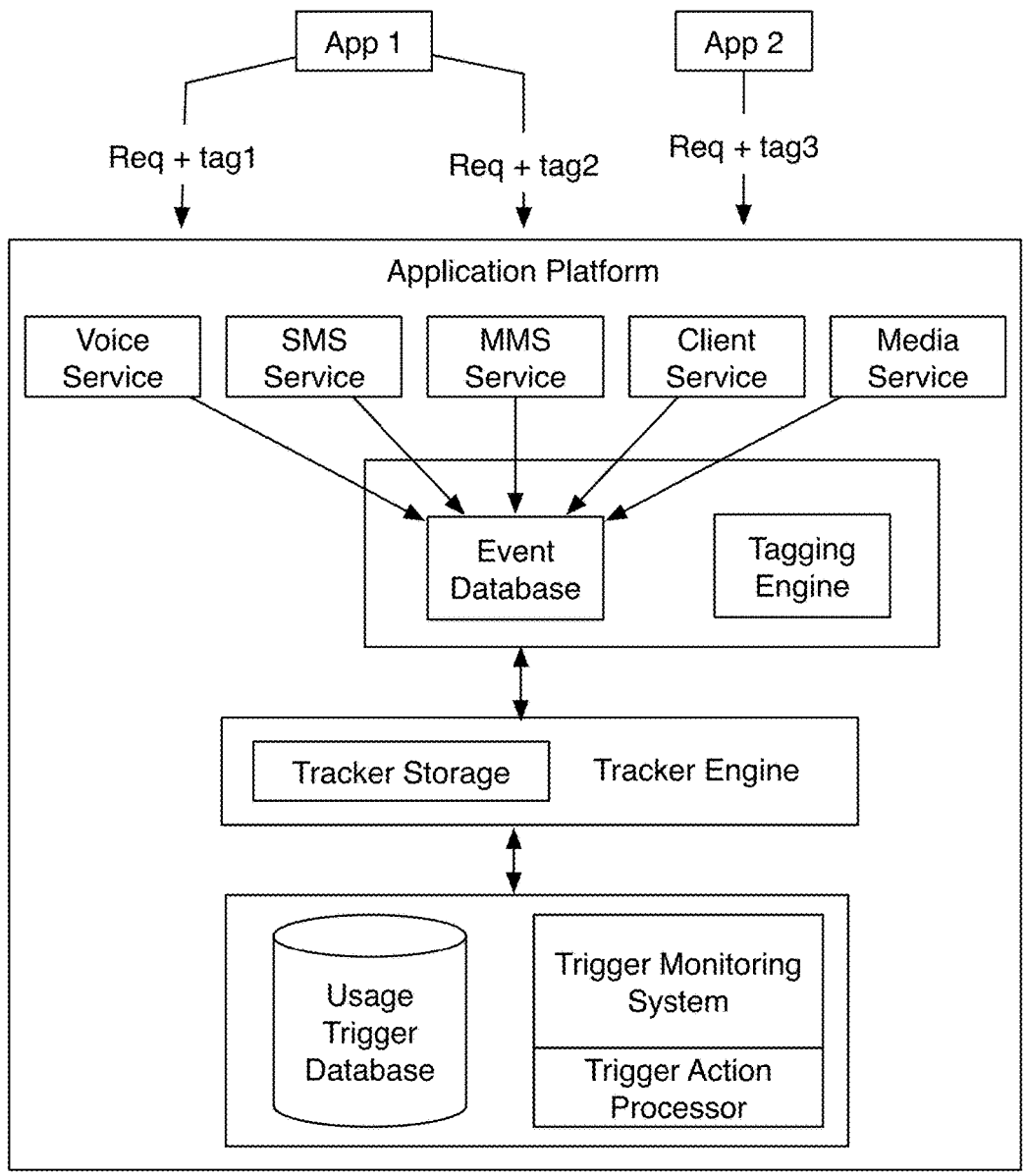
FIG. 4 is a schematic representation of a tagging and tracking system of a preferred embodiment of the invention.

In an alternative embodiment, the system can additionally include a tagging engine and a tracking mechanism as shown in FIG. 4. The system of the alternative embodiment functions to allow account holders to annotate, mark, classify, or identify platform usage such that the associated events and interactions can be tracked and/or used to trigger actions. Tags, trackers, and triggers can be used as a suite of tools enabling an alternative customization mechanism in a platform. The tags, trackers, and triggers can have particular benefits with the platforms mentioned above which operate on behalf of outside account holders and applications and can include a security layer separating the platform and outside applications. Tags, trackers, and triggers can enable a platform to offer a wide variety of events that can be tracked or used to trigger responses in a scalable manner. Instead of incurring considerable resource overhead by globally tracking all events, the system allows an account holder to specify the manner of tracking. Additionally, tagging can enable interaction classification from the outside application to be integrated with internal operations.

The tagging engine functions to enable identifiers to be associated with account platform interactions. When an account is interacting with the platform, a tag parameter can be added to the interaction or request. That tag engine then associates that tag identifier with the corresponding logged records of the platform. In one instance, a single event record is recorded in response to an outside account request. That event record is stored such that event can be retrieved by querying the logs for the tag identifier. In another instance, an outside account request results in multiple events and/or services logging event information while completing the request. For example, two internal services may facilitate completing a request. Events logged by the two internal services that are a result of completing the usage instance can both be associated with the usage-instance identifier. In one implementation, the tag is associated with a usage-instance identifier such as a session identifier, an API call identifier, or message identifier. For example, a telephony platform can use call identifiers to identify any action taken while servicing a particular call. When querying the tag, the associated events and logs are retrieved.

Figure 5:
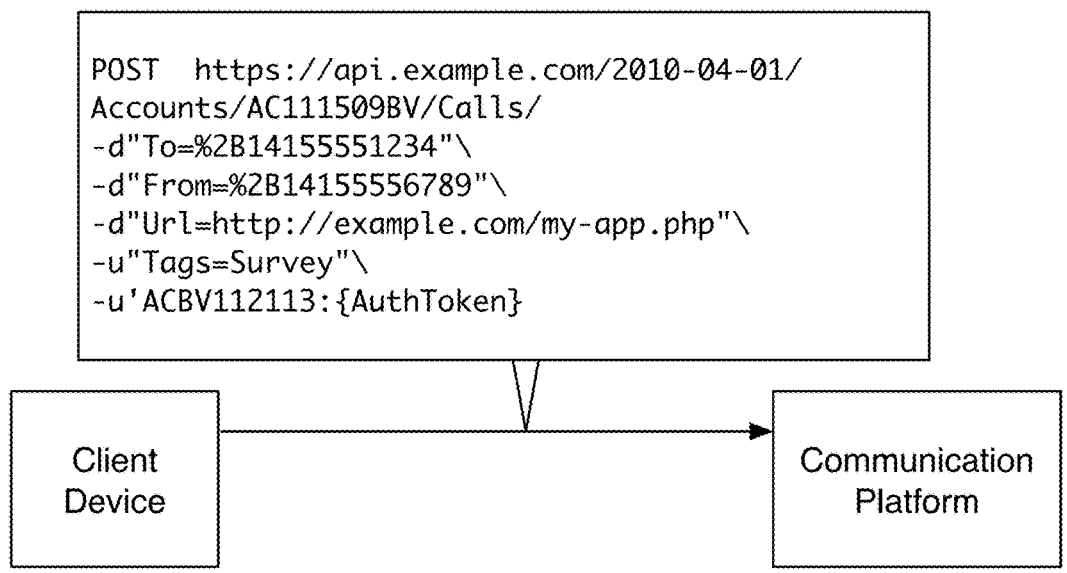
FIG. 5 is an exemplary API request adding a tag to an action.

The application platform preferably includes a mechanism through which tags can be attached to interactions. The tags can be attached during API requests, SDK function calls, application instructions, or other suitable interfaces that an account uses when directing a platform. As shown in FIG. 5, an API call to the platform can include a parameter defining a tag, which will be applied to resulting events and logs within the application platform. The tagging engine can additionally include modules to automatically tag events and items. The automatic tags can be created and attached to events based on rules, fuzzy matching, machine learned traits, and other suitable matching rules. Account holders can configure the automatic tags. For example, an account can setup an automatic tag for any API request with a parameter within a set of defined values. The automatic tags can alternatively be applied by the application platform, globally to all accounts or selectively for a sub-set of platform usage. Auto-tagging rule configurations can enable an account holder to define a set of conditions for which an event will be automatically tagged. For example, a telephony application platform can tag all call sessions and corresponding events with a "mobile" tag if the destination endpoint is a mobile phone number. More complex auto-tagging rules may be defined. For example, an event record may be tagged with "foo" for any event that includes the pattern of property A and B but not C or the pattern of having property D with a value greater than a specified value.

The tracking engine functions to configure monitored usage within the application platform. The tracking engine is operative on logged events and metadata recorded during usage of the application platform. The tracking engine manages a plurality of trackers, which can operate similarly to customizable counter objects. A tracker is preferably created by an account holder. A benefit of trackers is that account holders can use the trackers in combination with the tags to customize the usage analytics of an independent application platform. When creating a tracker, an account holder can specify one or more tags. The specified tags determine which logged events are evaluated for the tracker. Any suitable set and combination of Boolean operators can be applied to tags. The tracker can be for the union of two tags, the overlap of the two tags, the difference between two tags, the opposite of the union of two tags, or any suitable set of events defined through the tags. The tracker can additionally include event filters, which can use event types, event patterns, and other event properties to further define events evaluated by the tracker. Trackers can additionally include temporal properties that define the update frequency of the tracker. Trackers are preferably generated by an account holder through an API, a user interface, application instructions, or through any suitable interface mechanism of the application platform.

Figure 6:
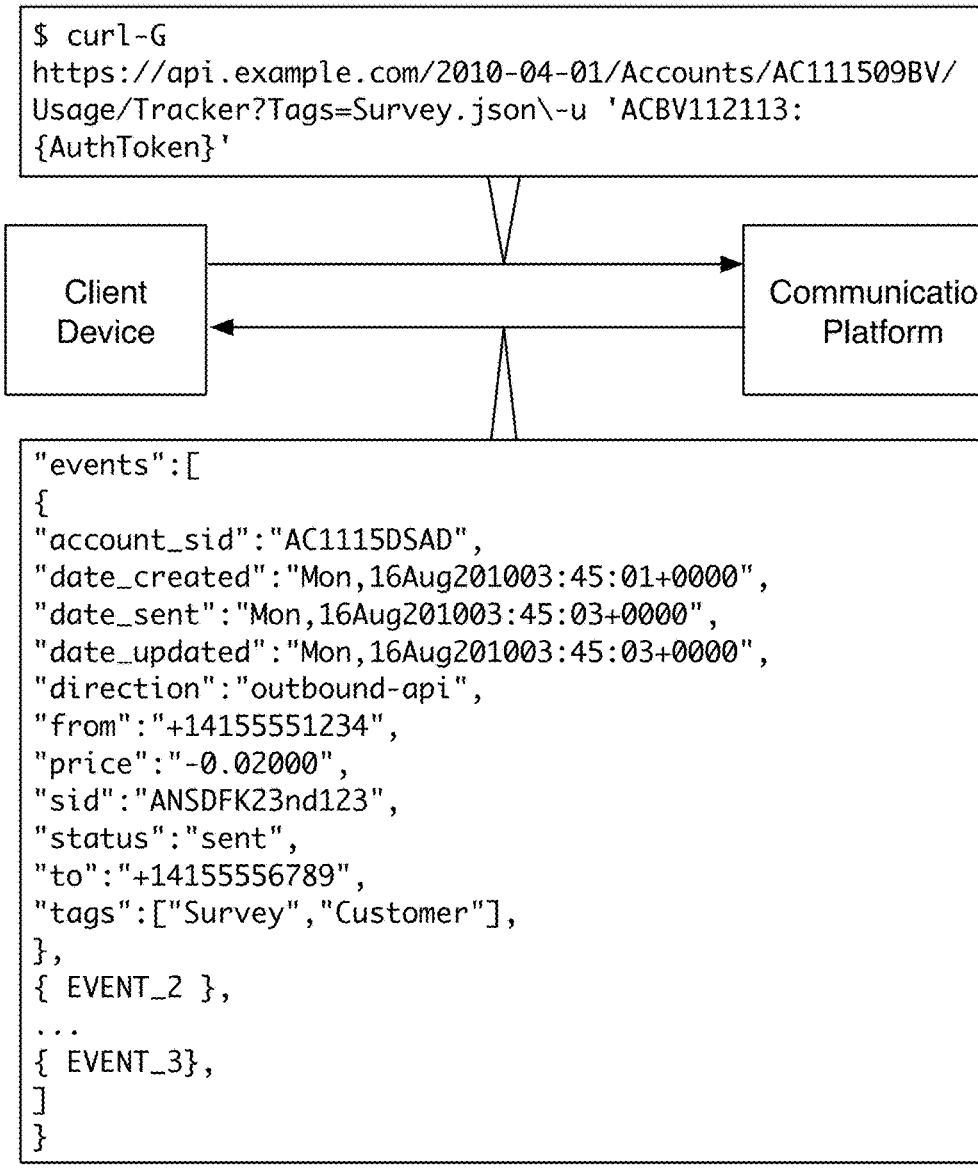
FIG. 6 is an exemplary API request accessing tracker data.

The tracker updates usage metrics of associated events according to the temporal property of the tracker. Similar to a counter, a tracker can maintain a measurement on the accumulated usage of associated events. API access is additionally made to read the status of a tracker as shown in FIG. 6. By reading a tracker, an application can acquire recent analytics on the customized tracking information.

The tracker engine can additionally enable trackers to be used in combination with usage triggers. Triggers can be associated or attached to trackers in addition to or in place of a counter. The triggers enable automatic action or responses according to thresholds or conditions. Callback URIs or automatic internal actions can be triggered based on the tracker metrics. An account can use tags, trackers, and triggers in combination to configure highly customized operations within a closed platform. The account holder will often operate an application server that has at least one security layer between the application server and the platform.

2. Method of triggering on platform usage

Figure 7:
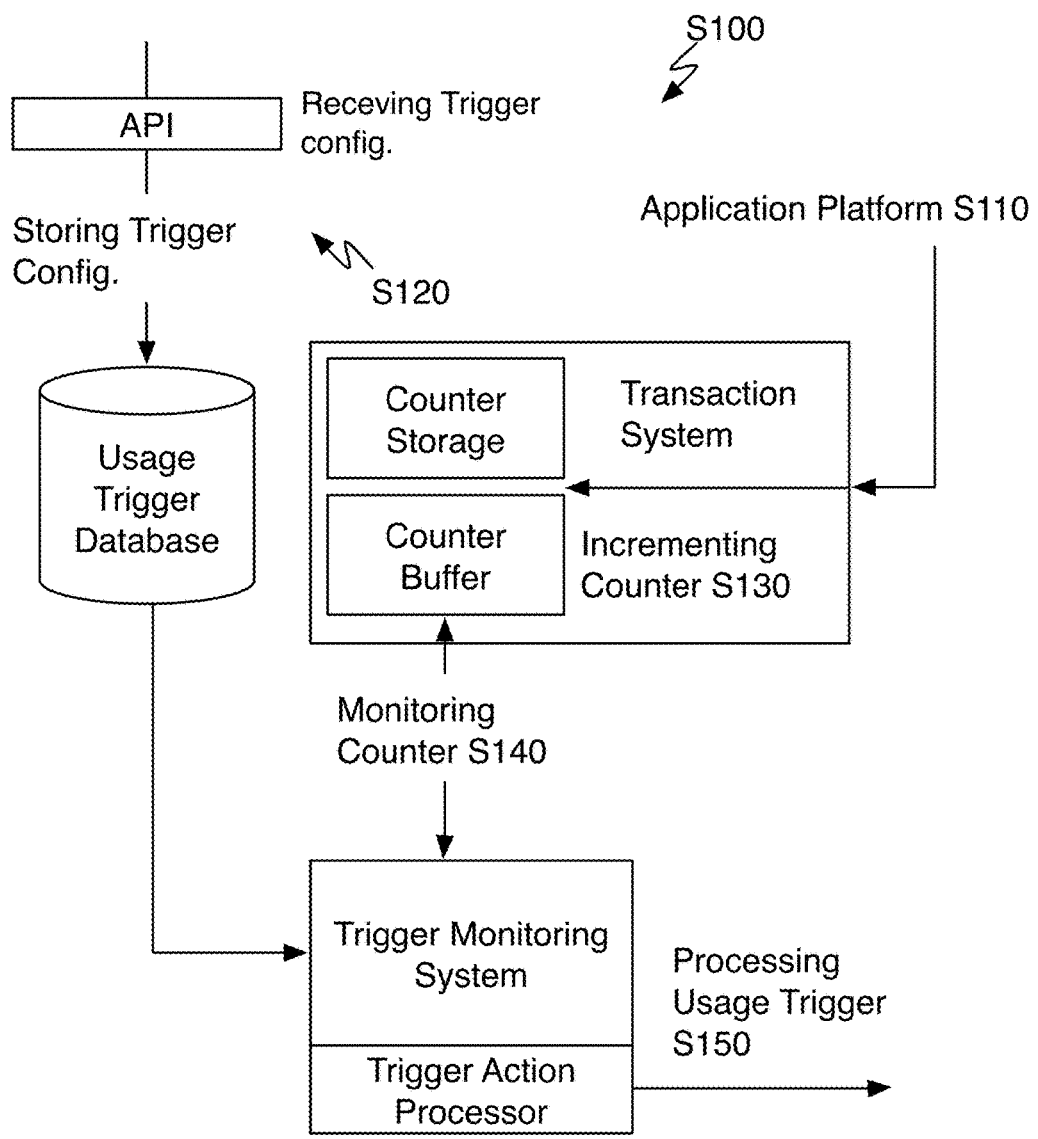
FIG. 7 is a schematic representation of a method of a preferred embodiment of the invention.
Figure 14:
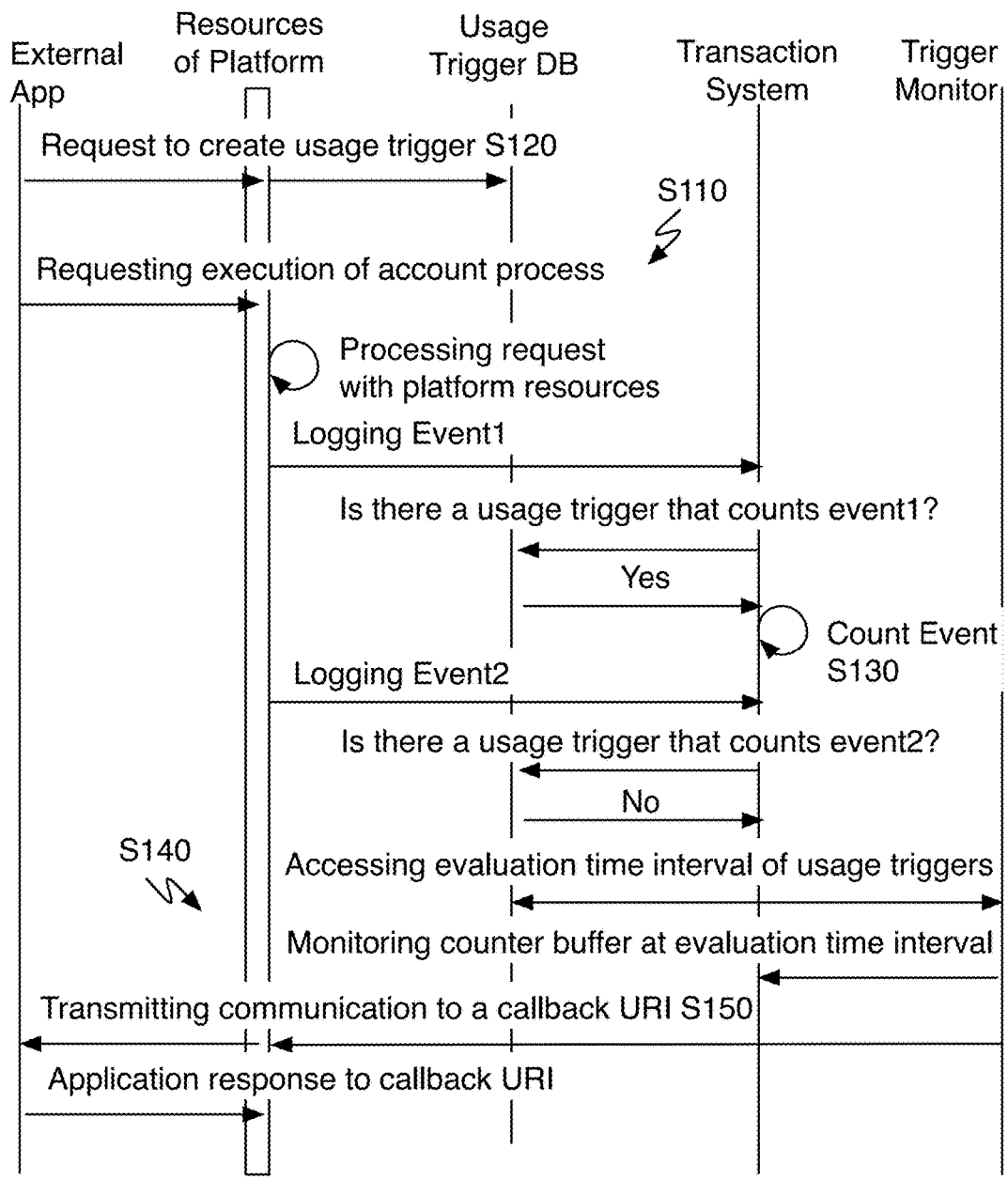
FIG. 14 is a communication flowchart representation of a method of a preferred embodiment.

As shown in FIGS. 7 and 14, a method S100 for triggering on platform usage of a preferred embodiment can include operating a platform S110; receiving a trigger configuration and storing the trigger configuration in a usage trigger database S120; a transaction system incrementing a counter S130; monitoring counters in context of an associated usage trigger S140; and processing usage trigger upon a counter satisfying condition of the usage trigger S150. The method functions to enable implementation of usage triggers for an application platform. The use of triggering on a platform usage may be substantially similar to the system and method described in U.S. patent application Ser. No. 14/054,464, which was filed on 15 Oct. 2013, which is hereby incorporated in its entirety by this reference. The method is preferably implemented by a system substantially similar to the one described above but can alternatively be implemented in any suitable manner. The method is preferably implemented at a system integrated with an application platform, but the method may alternatively be used in operation of a system providing a usage trigger service to outside applications and/or platforms. The method preferably enables usage triggers to be set by outside developers or users of an application platform.

Step S110, which includes operating the platform, functions to execute processes of the platform to generate events. As the method can enable multitenant usage triggers controlled by outside entities, the triggers enabled by the method may provide insight into events otherwise not viewable from outside entities through an API (e.g., for reasons relating to business issues, technical limitations, security concerns, and/or other reasons). The method can be particularly beneficial to application platforms that operate according to responses of an outside developer application. While the application platform can be actively prompted to perform an action, the application platform preferably includes an operation model where the platform independently processes data/information/events and communicates requests to outside applications for direction. An outside developer can configure an external application server to direct the application platform through instructions. Such a delegate operational platform model can be useful in infrastructure specialized platforms and/or platforms managing secure or private information. Telephony and/or communication service platforms are one example of an application platform that would have specialized infrastructures—there would be numerous business and security reasons why the system architecture and the raw event information could not be exposed to enable outsiders to build such a counter event system. Similarly, many application platforms would have access to a large amount of event information which could be pooled from within an account or across multiple accounts in a multitenant environment. Again, there would be numerous privacy, security, competitive advantage, and logistical reasons that could prevent directly exposing information enabling a counter event system, but the method of the preferred embodiment can accommodate such concerns. One characteristic of a delegate operational platform is that the platform can operate asynchronous to the execution of the outside application that uses the platform. In one embodiment, the method can function as an asynchronous try-catch feature of a platform for outside developers. In another embodiment, the method can function to integrate application business logic of an outside application with unexposed operations of an application platform.

Operating the platform preferably executes a process on behalf of an account, and, during execution of the process, events can be published. The events can be notifications from various services of the platform, errors, warnings, status updates or any suitable event log. Various services and resources of the platform publish the events. The method can work in cooperation with an existing event logging system or alternatively platform resources can directly publish events to the transaction system. Executing the process is preferably performed on resources inaccessible by an account holder (i.e., an account holder has limited visibility into events occurring). Executing a process can include processing a request made by an outside resource. Executing a process can alternatively include processing application instructions at least partially supplied by an account holder. In a communication service platform, executing the process can include facilitating/hosting/managing a synchronous communication session (e.g., voice, video, screen sharing or other suitable communication session). Application instructions can additionally be executed during that communication session. Executing the process can additionally or alternatively include a communication service platform sending/receiving messages (e.g., SMS messages, MMS messages).

Step S120, which includes receiving a trigger configuration, functions to configure settings that control trigger events within a system. The trigger configuration is preferably received as a request through an application programming interface (API). The API may be used to enable applications to programmatically create, read, update, and/or delete trigger configurations. The trigger configuration may alternatively be specified and transmitted through a user interface. For example, a user may be able to input usage trigger settings from an account management website. Usage trigger configuration preferably specifies at least one usage key to which the usage trigger relates. The usage key specifies the event, resource, error, or item counted and used to trigger a response. Exemplary usage keys can include total sales, call time, counts of events like sent or received messages, counts of particular API calls, measure of a particular resource usage, or any suitable usage type. The usage triggers are additionally set for a subset of usage of an application platform. The trigger request can additionally specify the type of counter such as an absolute counter that tracks a total number of events, a change counter that tracks number of new events from a starting point, time counters that track absolute or changes in usage time, a percentage counter that can measure ratios or percentage changes, rate counters that updates a counter to be the current rate or frequency of a particular event, or other suitable approaches of measuring usage. The usage key can include filters or pattern parameters, or other specifications to limit the counter (and correspondingly the trigger) to a subset of types of events. For example, the subset of events counted may be phone call events originating from a phone number within a set of area codes. Preferably, the subset of usage is defined by the account associated with the usage and the usage trigger. Additionally or alternatively, a subset of usage may include usage related to a sub-account, a type of usage, a regional grouping of usage, or any suitable subset of usage of an application. A usage trigger configuration is submitted along with an account or sub-account identifier. A token or key can be used to authenticate permission sot create a usage trigger for the specified account or sub-account. The usage trigger will be scoped to apply to usage of the corresponding account or sub-account. For example, usage triggers are preferably set by an account, and the usage triggers are only enforced for counters for that particular account.

The usage trigger parameters may additionally define a callback URI, an evaluation interval, and/or a trigger action.

The callback URI is preferably a resource identifier that can be messaged when the usage trigger is activated. The callback URI can be any URI. The callback URI can be a website URL of an application server operated by the account developer. For example, the callback URI can be to the same application server system used to generate application instructions for the application platform, the application server can modify subsequent instructions based on state generated in response to a usage trigger. The callback URI can alternatively be a URI of a resource of a third party. For example, a developer could setup a usage trigger to send usage-triggered events to a third party analytics server where logging and event analysis is performed.

A usage trigger parameters can additionally include security credentials, which can enable access to resources specified by a callback URI. In one variation, the resource of the callback URI (e.g., an application server operated by an account holder) may have a security layer isolating the resource from unwarranted traffic. Some security mechanisms may be communicated when receiving a trigger configuration. In one variation, an authentication token can be submitted which the application platform can store and use to sign outbound communications to the callback URI. The security credentials are preferably stored by the application platform and used when acting in response to a usage trigger. In one implementation, the security credentials are authentication credentials that are included in transmission from the application platform to the external application. The authentication credentials can be a username/password combination, a certificate, an authentication token or key, and/or any suitable authentication mechanism. An alternative approach to interfacing with security of an external application can use identifiable resources when accessing the application. Use of the identifiable resources preferably includes transmitting communication to a callback URI from a pre-defined IP address. In such a variation, the method can further include responding with a communication address of a resource of the platform. The communication address is preferably used when transmitting a communication to the callback URI. The account can use the communication address to configure an IP white list or a black list to selectively allow traffic. Such communication address information can alternatively be pre-configured through administrator controls. In another approach, virtual private network credentials can be shared between the application platform and an external system of an account, and a VPN tunnel is used when accessing a callback URI.

An evaluation interval is preferably the rule specifying when the usage trigger should be checked. In one variation, the evaluation interval is a polling interval. The polling interval could be hourly, daily, monthly, yearly, one-time event, or any suitable time interval. In another variation, the evaluation interval may be an event-based interval. In an event-based interval, the usage trigger may be checked when a particular event or series of events are detected. The usage trigger is preferably checked in Step S140 if the evaluation interval deems a check appropriate. The trigger request can additionally or alternatively specify counter thresholds that can define when the usage trigger and/or the associated counter are evaluated or acted upon. A threshold of a usage trigger can be used in combination or in place of a polling interval.

A trigger action of a usage trigger is preferably a response taken by the application platform when the usage trigger is enforced/activated. Exemplary actions can include suspending an account, sending a notification, ending a communication session, cancelling a message, and changing permissions. The trigger action may be used in combination with a callback URI or use as an alternative for the callback URI. The trigger action preferably enables system/platform functionality that could be configured in the creation of the usage trigger. In some variations, a trigger action can function to enable a response to be made that is not exposed through an API. Some exemplary trigger actions may include suspending an account, charging stored value from an account, charging a credit card, sending a notification or alert message by email, SMS, phone, IM, or altering the behavior of an application, and/or any suitable action. As an example, a calling card application may configure a usage trigger with a trigger action that prevents a customer to continue making international calls. Any suitable number and combination of callback URIs and trigger actions may be used.

Step S120, which additionally includes storing the trigger configuration in a usage trigger database, functions to create a repository of usage trigger configurations. The usage triggers may be stored in any suitable manner. The usage triggers are preferably retrievable based on the related counter. For example, a usage trigger for the number of messages sent from a particular account can preferably be retrieved using the account and the type of counter (e.g., number of messages sent). The application platform can be a multitenant platform. Storing the trigger configuration can include storing a plurality of trigger configurations of multiple accounts. The trigger configurations can be stored as accessible API resources. For example, a REST API usage trigger resource can be updated by an account holder submitting API calls to a "/usage/triggers/" resource or a particular trigger resource within the triggers resource path.

Step S130, which includes a transaction system incrementing a counter, functions to measure the usage from an application or platform. The transaction system preferably exposes an interface used by an application platform to update counters. Events are preferably published or generated by resources of the platform and submitted to a transaction system that logs and/or counts the events. The events can be any suitable type of events such as notifications, status updates, errors, warnings, summaries of multiple events, or any suitable event notification. In a preferred implementation, the platform is a communication service platform managing communication sessions of an account. The communication sessions are preferably telephony communication sessions controlled by telephony instructions managed by an outside account resource. In one variation, the communication service platform is used for voice calls such as PSTN, SIP, or other suitable forms of synchronous communication sessions. The synchronous sessions can alternatively be video, screen sharing or other suitable mediums of communication. In another variation, the communication services platform can additionally or alternatively be used for asynchronous telephony messaging over SMS, MMS, proprietary IP protocols, or other suitable forms of messaging. Individual events of the application platform are logged and added to the counter. In one variation, the events may only be counted if a usage trigger depends on counting such an event, which can function to sparsely account for counting events. In a multitenant platform counting all events of every account could incur considerable storage resources. The method preferably selectively counts events if a usage trigger depends on counting the event. The method can include the transaction system receiving an uncounted event, searching for associated usage triggers associated with the uncounted event, and if a usage trigger is associated with the event, counting the event in a corresponding counter. Searching for an associated usage trigger can include querying usage trigger resources of related accounts or sub-accounts. Global usage triggers can additionally be queried. The query can search for usage triggers with usage keys that match the event. If no usage triggers are identified then the event is not counted. If a usage trigger is identified then the event is counted. There can additionally be multiple counters that may be updated if for example multiple usage triggers have different usage keys that count the event. For example, an inbound mobile call can be counted in a counter for mobile calls and in a counter for inbound calls. If a counter object does not exist, a new one is created. If a counter does exist, the event is accounted for in the existing counter object.

Counters are preferably any suitable data objects characterizing a metric of the application platform. Counters can be defined for any suitable type of usage. In some implementations, default counters can be defined for a plurality of types of events regardless of existence of a related usage trigger. Such counters can be for commonly counted events. Usage triggers can be added and immediately act on the current state of usage with default counters. More preferably, counters are sparsely defined according to the active usage triggers stored in the application platform. Sparsely defined describes the property of counter storage where counters are not stored for the full set of countable items for all accounts on the platform. Counters are created or updated if a usage trigger depends on counting a new event. As shown in FIG. 5, new events may result in querying for relevant usage triggers before counting the event. If a usage trigger expires or is deleted, associated counters can be deleted if no other usage trigger depends on the counter. Counters are preferably stored according to an account and type of counter. Counters may alternatively be keyed or indexed in any suitable manner. Additionally, when incrementing a counter, the counter is preferably added to a buffer for monitoring. Adding a new counter to the buffer may include temporary storing, copying, adding a reference, or adding any suitable representation of the counter to the buffer.

As shown in FIG. 2, the method can include storing individual event records of at least one service of the application platform, summarizing stored event records into a group, and updating a counter according to events in the group. This variation functions to allow resources and services of the application platform to log events to a basic storage or event management service. The counters can be generated from this record. In an alternative approach, services and resources of the application platform (or alternatively an event logging proxy) can communicate events simultaneously to an event log and to a counter transaction system.

Step S140, which includes monitoring counters in context of an associated usage trigger, functions to determine if a counter requires action by a usage trigger. A trigger monitoring system preferably monitors the status of counters updated by the transaction system. The trigger monitoring system preferably monitors the buffer maintained by the transaction system, but the monitoring system may use any suitable technique to check the status of the counters. When a counter is updated, it is preferably added to a buffer. Once in the buffer, the trigger monitoring system will preferably read the counter from the buffer. It will then see if the account associated with that particular counter has a usage trigger for that type of counter. If there is an associated usage trigger, the trigger monitoring system may additionally check if the evaluation interval of the usage trigger is satisfied. When a usage trigger is identified for the counter and any additional conditions such as the evaluation interval are satisfied, then the usage trigger is processed and acted upon in Step S150. The counter is preferably removed from the buffer once the counter is analyzed. In a related approach, the usage trigger may be processed according to the timing of the evaluation interval and the related counters are updated in response. When it is time to process the usage trigger, a trigger monitoring system can update associated counters. In one variation, a counter buffer is used to record which events have not been accounted for in the current counters, and in particular, which events that contribute to the counter associated with the currently processed usage trigger. The evaluation interval prompts the counters to be updated. Events referenced in the counter buffer are measured and accounted for in the counters associated with the usage trigger. Such a variation can be used with usage triggers for errors and warnings. A similar variation can prioritize the update of counters with usage triggers with upcoming intervals.

Additionally, the method can include identifying events satisfying a pattern of a counter type, which functions to allow pattern matching, fuzzy grouping, or algorithmic identification of event types. A summarizer as described above or any suitable grouping engine can determine if an event should contribute to a particular group and if so which one. If a usage trigger defines a counter type that depends on pattern detection, an event pattern definition can be created and used within a summarizer system when processing events. The summarizer can consume events from a raw event log, and if the event satisfies an event pattern definition, accounts for the event in the associated counter.

Step S150, which includes processing usage trigger upon a counter satisfying a condition of the usage trigger, functions to perform the response specified by the usage trigger. In a first variation, the usage trigger is satisfied when the evaluation interval has expired and the measurement of the counter satisfies a condition. The condition is preferably defined by a threshold limit defined in the usage trigger configuration. The threshold can be a maximum threshold where the usage trigger is processed when the measurement of the counter exceeds the threshold. The threshold can be a minimum threshold where the usage trigger is processed when the measurement of the counter is less than the threshold. The condition can alternatively be a range, a function of other properties including at least one measurement of a counter object. Processing a usage trigger preferably invokes the action configured for the usage trigger.

In one variation, the usage trigger configuration includes a callback URI parameter. Processing the usage trigger can include sending a request (e.g., HTTP request) to the callback URI, which functions to alert, message, or notify a resource of the counter status. The URI is preferably for an internet accessible resource that can perform any suitable action after receiving the request. The URI is preferably an external resource operated by the account associated with the usage trigger. For example, a first application created by a first account can create a usage trigger. When a counter of the usage trigger satisfies a condition, the external transmits a message to a resource specified by the callback URI. The callback URI request may additionally include data parameters characterizing properties of the counter and/or usage trigger. The application server can then perform any suitable action. As exemplary external application actions, an application server could update a database based on the event, alter state of a session controlled by the application server, send an alert to a developer, or any suitable response. In one implementation, an application server can respond by sending a response to the callback URI call. The response can include application platform instructions. The application platform instructions can act similarly to the trigger actions described below in that they alter state of the application platform. In one variation, a callback URI could be to a third party application server, such as an analytics service operated by a service distinct from the account holder and the application platform operator.

Figure 8A:
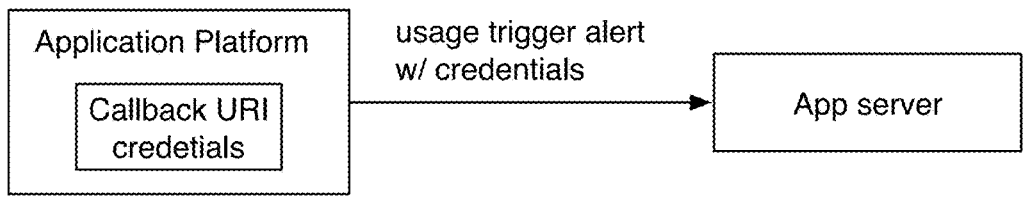
FIGS. 8A-8C are exemplary representations of sending a request according to a security procedure.
Figure 8B:
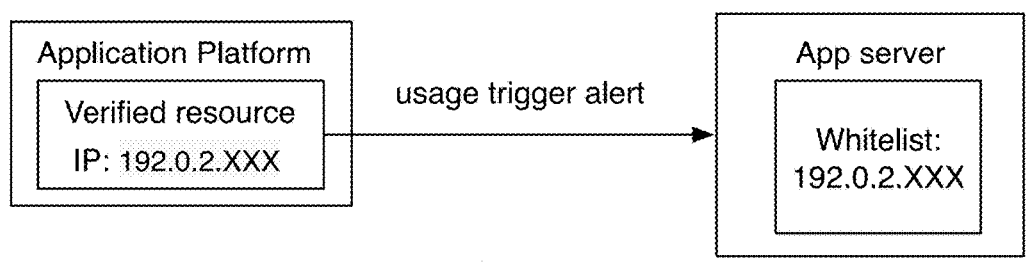
Figure 8C:
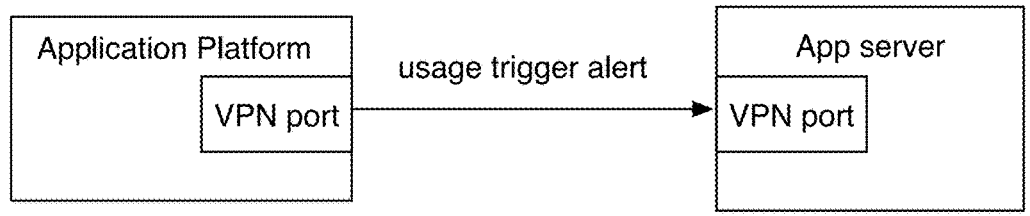

When sending a request to the callback URI, the method can additionally include sending the request according to security procedures. The resource referenced by the callback URI can be secured against unwarranted access. An open URI or a private URI can be contacted by any outside entity, which may be sufficient for some situations. A secured callback URI includes some mechanism to limit access of the callback URI. In one variation, security credentials of the usage trigger are used to access the callback URI. The external application can use the security credentials to authenticate or authorize access to the callback URI as shown in FIG. 8A. If the security credentials are not validated by the application, then the communication directed to the callback URI can be denied. In an alternative variation, the security procedures can include sending the request from a verified resource of the application server as shown in FIG. 8B. The verified resource of the application server can include machine with a static IP address, a machine with VPN pipe to an external resource of the account holder, or any suitable private communication channel between the application platform and the external application. The verified resource can have a fixed IP address that can be pre-arranged as a trusted communication source. The external application can whitelist or blacklist IP addresses such that the verified resource is permitted to contact the callback URI. As an alternative approach a pre-arranged communication channel can be established. Sending the request according to security procedures can include establishing a VPN pipe and sending the request across the VPN pipe as shown in FIG. 8C.

As an additional or alternative variation, the usage trigger configuration may include a trigger action. Processing the usage trigger can include performing an action specified by the associated usage trigger. This variation preferably enables real-time response within an application platform. In some situations the actions that may be performed may not be exposed to outside entities through an API, thus the action enables responses that in some situations wouldn't be available to outside entities. For example, if there is a call being performed over a telephony application platform, and the call uses up all pre-paid minutes during the call, the usage trigger may have a trigger action to end the call. Thus the usage trigger enables an outside entity to build event based functionality without having to maintain an application to cancel the in-progress call or even be reliant on that functionality being exposed through an API. Executing a trigger action may additionally or alternatively include suspending an account, charging stored value account, charging a credit card, sending a notification or alert message by email, SMS, phone, IM, or altering the behavior of an application, and/or any suitable action.

Additionally, processing the usage trigger can include resetting or removing the usage trigger. In some instances, a usage trigger can be configured as a single use usage trigger. After the usage trigger is processed, the usage trigger resource can be removed or suitable managed to end use of the usage trigger. A counter associated with the usage trigger can similarly be deleted or closed. In some instances, a usage trigger can be configured to reset. Preferably, resetting a usage trigger includes creating a new counter or clearing the counter. Resetting a usage trigger can be used to enable actions that are triggered after a specified number of occurrences.

3. Method for Tagging and Tracking Platform Usage

Figure 9:
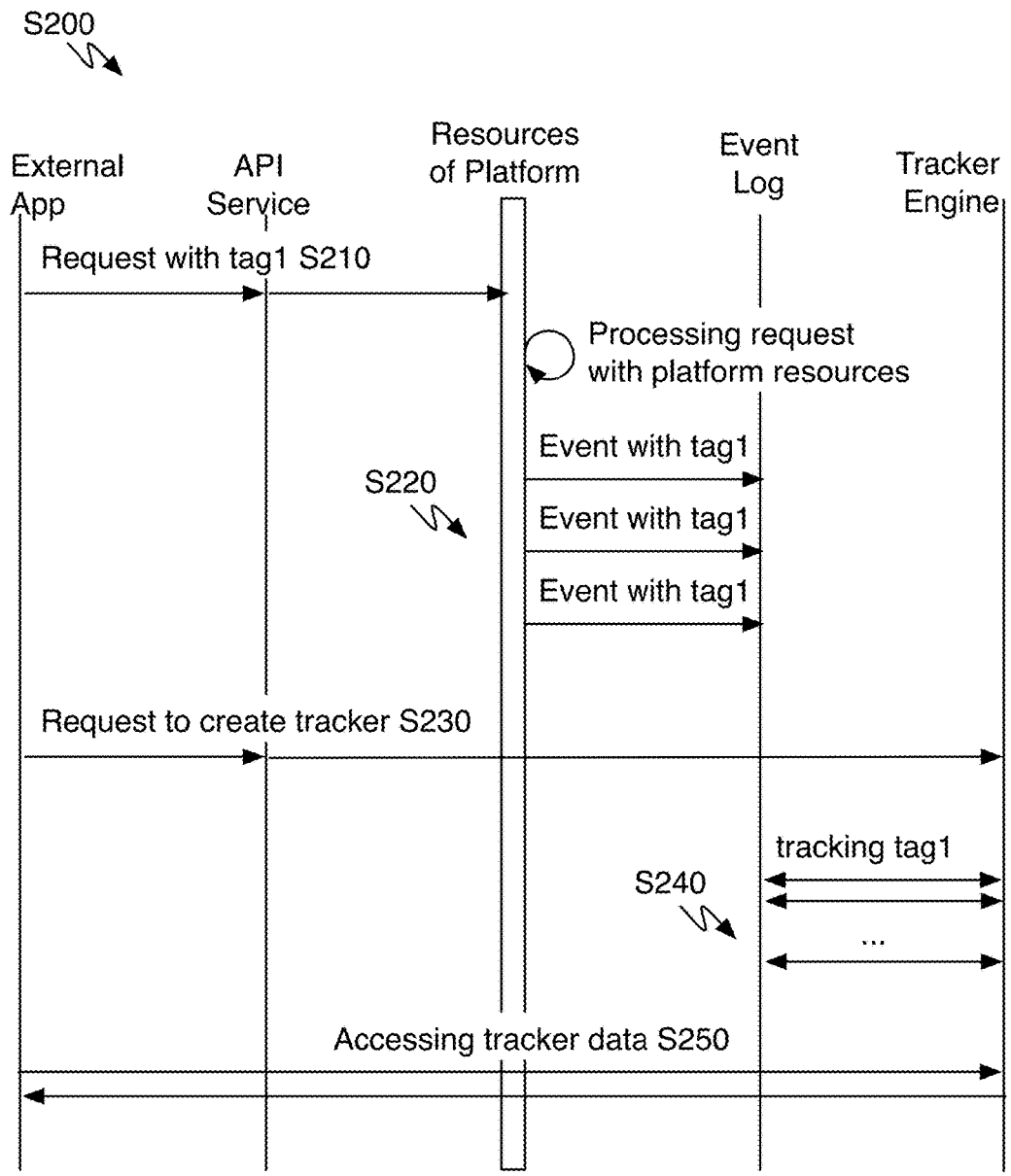
FIG. 9 is a communication flowchart representation of a method of tagging and tracking embodiment of the invention.
Figure 10:
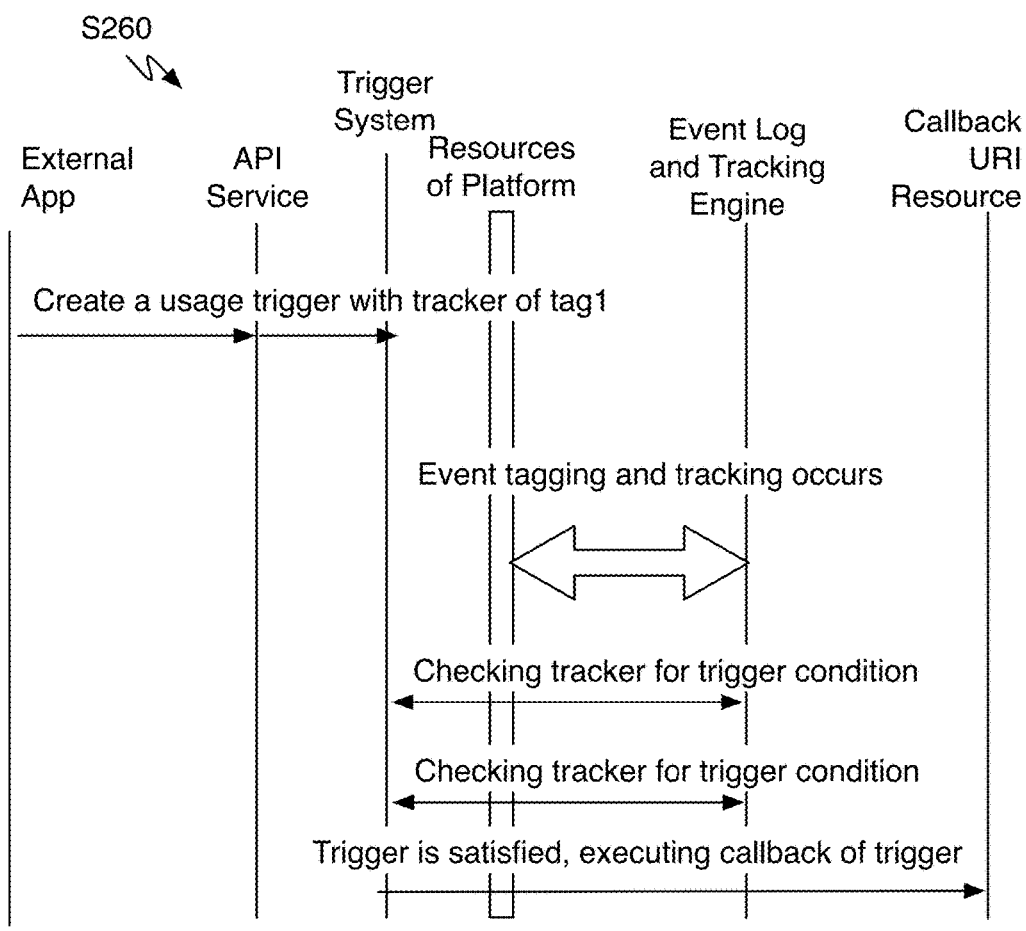
FIG. 10 is a communication flowchart representation of a method of tagging tracking and triggering.

As shown in FIG. 9, a method S200 for tagging and tracking platform usage of a preferred embodiment can include receiving a tag identifier S210, associating the tag identifier with a logged event S220; defining a tracking resource with at least one tag identifier S230; measuring platform interactions tracked by a tracking resource S240; and providing access to measured platform interactions through an application programming interface S250. Additionally, the method can include creating a usage trigger conditionally activated by a tracker S260 as shown in FIG. 10. The method functions to allow outside applications operated by accounts of the platform to customize usage analytics and usage-based eventing within a closed platform. The application platform, as above, operates independently from outside applications, and internal operations and process execution can be hidden from outside users. At least one layer of security can separate the system of an account holder and the resources of the application platform. The method enables accounts to annotate, mark, classify and identify interactions with a platform, which can subsequently be used in attaching tracking and/or triggering mechanisms. An account holder cannot customize the internal operation of an independent application platform, but the method enables a flexible set of tools for an outside application to direct manipulation of logs, tracking, and conditional responses. The set of tools (i.e., tags, trackers, and triggers), however, allow an application platform to maintain security and privacy from internal operational infrastructure and data. The method is executed by a platform, and can be initiated in response to requests and direction of an account. In some variations, the method can depend upon automatic tagging and tracking.

Block S210, which includes receiving a tag identifier, functions to obtain direction for customized classification of the interaction and resulting events and logs. The tag identifier is preferably received through an account-initiated action. An account can be any suitable entity. Preferably, the account is used by an outside party to which internal operations of the platform are hidden. The account is preferably a developer account to which a developer can build applications and software services that use account credentials in making requests and/or instructing a platform in how it should be used. At least one security layer preferably exists between the account and at least a subset of internal resources and services of the platform. The tag identifier can alternatively be automatically applied to application platform interactions according to pre-defined event classifiers. The pre-defined event classifiers can be defined by an account entity, the application platform, or a third party. A tag identifier is preferably a descriptive text phrase or word used to mark or denote a characteristic of the event. Multiple events and interactions can be identified with an identical/shared tag identifier. A tag identifier shared between two or more events can enable those events to be grouped for analytics and/or usage-based event triggering.

Figure 11:
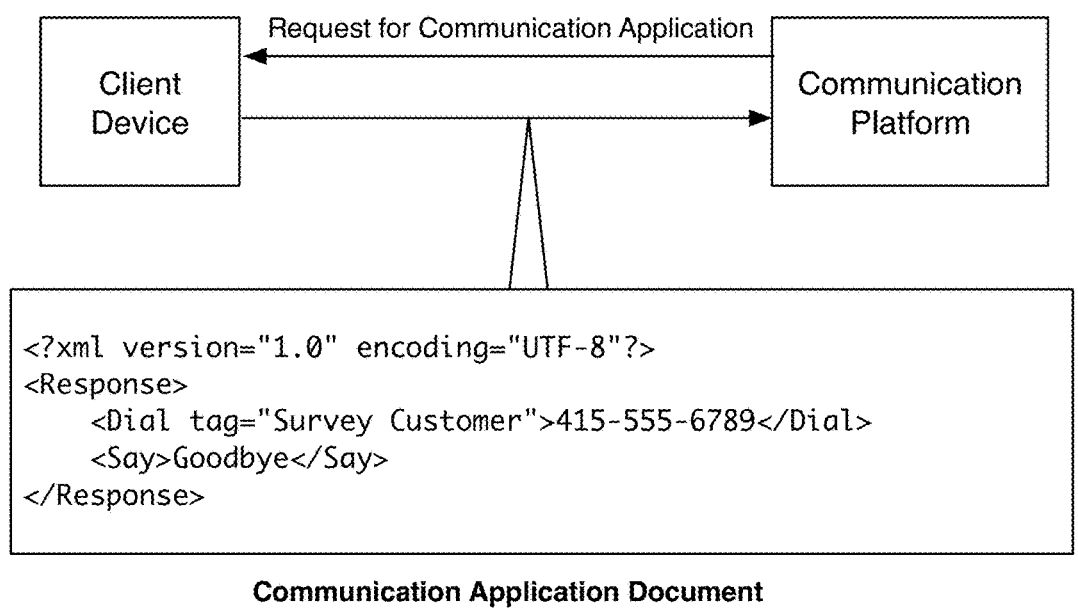
FIG. 11 is a schematic representation of tagging an application.

Receiving a tag identifier preferably includes detecting a tag identifier as a metadata parameter of a platform instruction. Platform instructions may be executed through an API, through application instruction processing, through user interface actions, or through any suitable mechanism. In one variation, detecting a tag identifier as a metadata parameter of a platform instruction can include receiving an API request that includes at least one tag identifier. As shown in FIG. 5, a REST API request can include a tag identifier. The tag identifier property is preferably an optional data property that can be used in an API request. In one variation, all API requests may be tagged. In an alternative variation, a subset of API calls may support tagging. For example, API calls related to making calls, ending calls, or changing state of a call may support tagging. Receiving a tag identifier can alternatively include processing application instructions wherein one instruction includes at least one tag identifier as shown in FIG. 11. In one variation, a script or application source document may be uploaded by an account and used in customizing the business logic of the platform. In one preferred implementation, the application instruction is encountered in a document of procedurally processed communication instructions. The communication instructions may be structured in a markup language format. Preferably, at least a subset of the instructions is processed in a sequential manner.

An account holder can arbitrarily define tag identifiers. A new tag identifier can be used to create a new tag identifier. The tags can additionally include a hierarchical relationship, such that a first tag identifier can be a parent tag that includes child tags identifiers. A set of tags may additionally be received or detected, and associated with the platform interaction. A set of tags associated with a platform interaction is then accordingly mapped to related events. For example, if a developer wants to track calls made by pro account and that are initiated from their mobile app, the developer can use the tags "pro" and "mobile-app" for different platform interactions. If one platform interaction is made by a pro account using the mobile app then that related instruction may specify the field "tags:[pro, mobile-app]". The tag identifiers can be used by the account holder in any suitable manner. Account-side metadata around the platform can be attached to platform actions without exposing the internal operation of the platform and without the platform needing account specific knowledge of how the account is using the platform. An application of an account can use internal log and data to classify different uses of the application platform. Multiple accounts may have various requirements when using the application platform, and the different accounts can customize the manner of tag usage to meet their respective application requirements.

Figure 15:
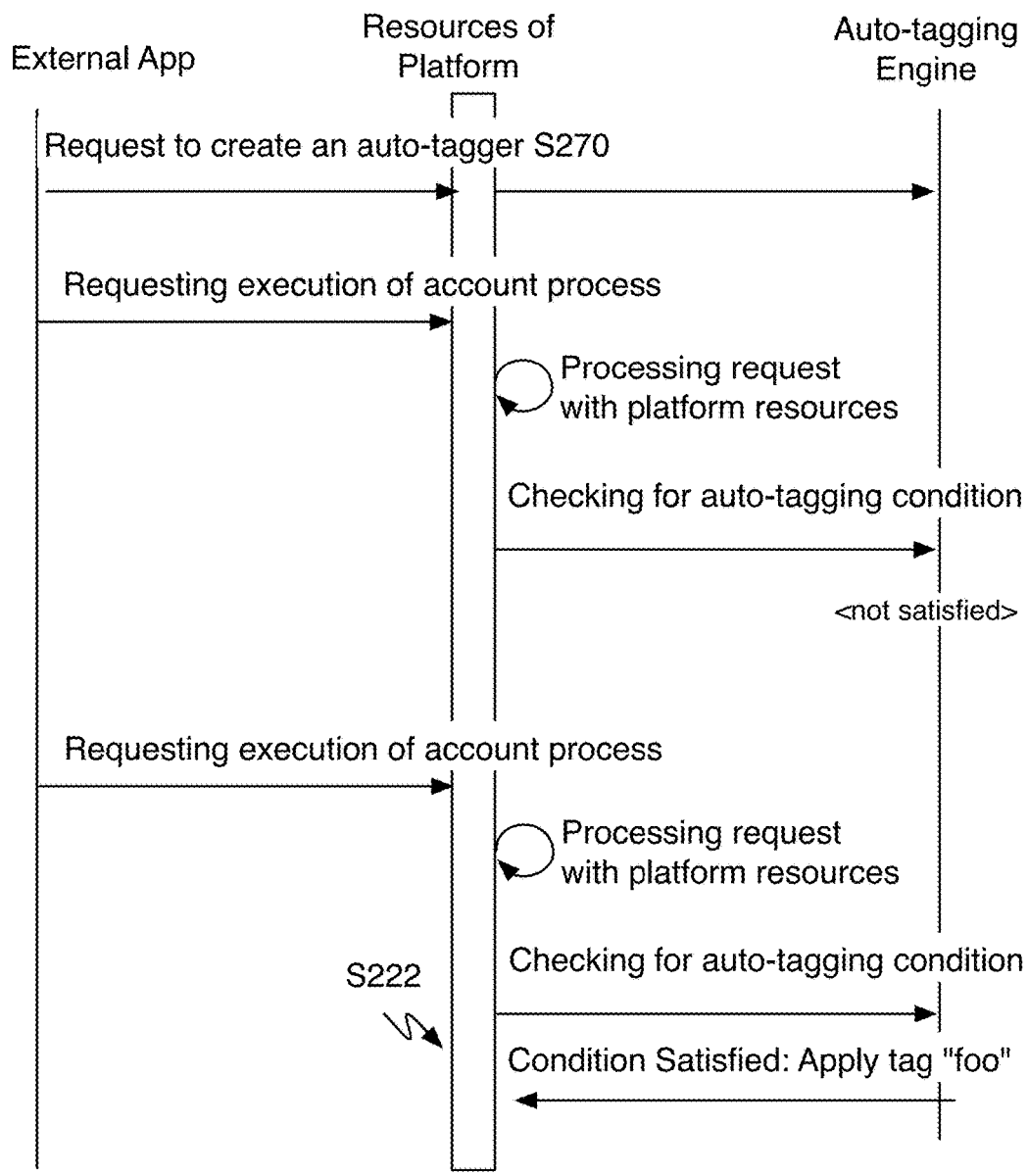
FIG. 15 is a communication flowchart representation of applying an auto-tagging rule.

As mentioned above, a tag identifier may additionally or alternatively be detected and associated with a platform interaction through automatic tagging as shown in FIG. 15. This variation preferably includes obtaining an auto-tagging rule configuration S270. In the course of processing auto-tagging rules, Block S220 can include automatically tagging events that satisfy the auto-tagging rule configuration S222. Automatic tagging, functions to enable tags to be attached to a platform interaction according different conditions. As shown in FIG. 12, an auto-tagging rule configuration preferably defines a pattern of properties that should receive a particular tag. The auto-tagging rule configuration is preferably a structured data object that specifies property conditions and the applied tag identifier. Any platform interaction that satisfies the property conditions will be tagged with the specified tag identifier. If the automatically tagged platform identifier has an explicitly specified set of tags, the explicit tags and the automatic tags are combined. Preferably explicit tags and automatic tags are treated equivalently in the system. In one variation, explicit tagging and automatic tags are different classes of tags.

An auto-tagging rule configuration, in one implementation, is specified as a markup document as shown in FIG. 12. The auto-tagging rule configuration schema/markup can be uploaded or otherwise entered into the system. Auto-tagging rule configurations are preferably set within an account context (e.g., a main account or a sub-account). An auto-tagging rule configuration may additionally be used globally across the platform. For example, the platform may use the auto-tagging mechanism to provide some default auto tagging features, which, in one variation, may be selectively activated per account. An auto-tagging rule configuration can alternatively be specified using an API using any suitable protocol or schema in defining the auto-tagging rule configuration.

An auto-tagging rule configuration can preferably specify any suitable condition for when to apply an automatic tag. A set of properties can be exposed, on which a condition can be formed. The properties may include platform interaction type (e.g., PSTN call, SIP call, video call, text message, media message, etc.), endpoint properties, carrier properties, communication metrics, and/or any suitable properties. Endpoint properties are preferably properties relating to a caller, callee, or any suitable endpoint involved in the communication. Endpoint properties may include country code, mobile/landline, regional area code, endpoint type, the endpoint address, geographic information of where the endpoint communicated from, and/or other endpoint properties. Call metrics may include media quality, duration of the session, and/or any suitable metrics.

The conditions may use Boolean algebra (AND, OR, XOR, NOT, etc.), set mathematics (Unions, intersections, etc) or any suitable mechanism for defining a condition. In one variation, a callback mechanism may enable customizable processing to be performed to indicate if a element matches a condition. When a particular context has one or more auto-tagging rule configurations, a set of platform interactions are preferably processed to determine if they satisfy an auto-tagging rule, and, if an event does meet the conditions, the tag is applied. Otherwise, the event is not automatically tagged. Multiple auto-tagging rules may be defined, and each condition is preferably checked. In one variation, auto-tagging detection is applied as the events occurred (e.g., in real-time). Auto-tagging detection may alternatively be applied as a synchronous step at any suitable time after an event. For example, auto-tagging may be applied periodically on a batch of logged events.

Block S220, which includes associating the tag identifier with logged event, functions to assign the tag identifier to related platform events and usage. The tag identifiers are preferably used to track and monitor internal operations. An event is preferably logged in association with an account that is associated with the platform interaction that resulted in the logged event. When executing a platform interaction, a set of different actions can occur, and the tag identifier association is preferably maintained for the set of different actions. For example, to service an API request, multiple different internal platform resources may perform different steps to completing the API request. The multiple internal platform resources can log different events as part of internal logging measures, and the various logged events are associated with the specified tag identifier. Associating the tag identifier with an identified platform interaction event preferably includes associating the tag identifier with a set of logged events that are within the same session context as the initially identified platform interaction event. A session context is preferably any property or conditional set of properties that define a collection of related events platform interactions. As described below a context session can be a communication session. Synchronous communication, such as a phone call or video call, may be defined as all the events relating to one particular sustained session of communication between a set of endpoints. Such a communication session may be identified in the logs by a call identifier. A communication session for asynchronous communication may be defined by all communications that occur between a consistent set of endpoints at some frequency. For example, an SMS, MMS, or IP messaging communication session may be segmented by delays of 30 minutes or more between messages. A session context may alternatively be within set time windows. For example, all communications for a particular day. In one variation, the tag identifier is applied to the set of subsequent events in the session context. In another variation, the tag identifier may be retroactively assigned to previously logged events.

In a telephony application platform of a preferred embodiment, the tags can be assigned through API requests or through telephony instructions in an application document supplied by an application server of an account. An API request can be used to initiate an outgoing voice call (e.g., PSTN, SIP, etc.), video call, screen sharing session, message (e.g., SMS, MMS, push notification, or IP message), or other forms of communication. A communication API request can include one or more tag identifiers. Logs, events, and other metadata stored in association with the communication can be associated with the tag identifier. An API request can be used to augment an active communication session. Such API requests can similarly include a tag identifier. The tag identifier can be added to the whole call session, to subsequent logs, or to a subset of events that directly relate to the action used to augment the communication session. A new tag can alternatively replace a previously specified tag attached to the call session. A telephony instruction within an application instruction document can include a specific tag identifier Block S230, which includes defining a tracking resource with at least one tag identifier, functions to create an object within the application platform to count and measure usage and events. A tracking resource is preferably created according to the direction of an account. An account holder can use an API, graphical user interface, a configuration file, or any suitable mechanism to specify properties of one or more tracker resources. The tracker resources are preferably active within the account. A tracker can include a tracking pattern and a temporal update parameter. The tracking pattern is preferably a tag parameter that can include one or more tag identifiers. In one variation, the tracking resource is defined by a markup language document as shown in FIGS. 13A, 13B, and 13C. Boolean logic based conditions can be defined for the set of tag identifiers as shown in FIG. 13B. For example, a tracking pattern may be specified that the tracker should track all events with the tag "foo" but not "bar". Additionally, the tracking pattern may include other key identifiers, which may be any of the event properties as described above for the auto-tagging rule configuration. The tracking pattern can be a Boolean function (or switching function) that is at least partially based on tag identifiers. The tracking pattern is used to define which events and usage are of interest to the tracker resource. The tracking condition is used to identify which logged events should be counted. In one variation, the tracker resources functions as a customizable counter, wherein arbitrary definitions of events may be configured for counting and measuring. The tracker resource will be used to measure or track different sets of events. The tracking pattern can define a subset of the total account events within the application platform. The temporal update parameter can be used to define the update frequency and timing. In one variation, tracker resources can be automatically updated for each relevant account. A tracking resource may additionally include a measurement property, which defines what and how events should be accounted for as shown in FIG. 13C. A measurement property can define what property of the events are measured in Block S240. The measurement property may additionally define how the event property is accounted, (e.g., added, averaged, etc.).

Block S240, which includes measuring platform interactions associated with the tag identifier, functions to account for relevant logged events. Measuring platform interactions is preferably achieved in connection with operating the computing platform. Operating the computing platform preferably includes internally executing a process on behalf of the platform interaction and logging at least one event. In response to those generated events, block S240 can facilitate accounting/measuring at least one metric of the tracking resource in response to a logged event satisfying a tracking condition of the tracking resource. The tracking resource is used to track the occurrences of particular types of events. The tracker resource is preferably updated according to the temporal update parameters. When updating a tracker resource, an event log is queried for new events matching the tracking condition. In one simple scenario, tracker resource, the tracking condition is a single tag. An event log record that matches the tag parameter of the tracker resource is Boolean function with multiple Tag identifier arguments. If the event record satisfies the Boolean function based on the tag identifiers for that event then it is included in the measurement. In yet another scenario, the tracking condition can be a Boolean function with tag identifier arguments and general event properties. The retrieved events can then be processed and appropriately added to the tracker measurement. In one variation, the measurement is a measure of number of events, and a tally of event occurrences can be used in an event tracker. Accordingly, Block S240 can include recording a running number of events that satisfy the tracking pattern. In another variation, the measurement is a measure of a property related to the event, wherein Block S240 can include updating an aggregated metric of events that satisfy the tracking pattern. The property is preferably a usage property such as such as data usage, call duration, request size, or other usage property. The aggregated metric may alternatively be an overall statistic such as an average, median, maximum, minimum or other suitable statistical metric of one ore more property values of an event. An aggregated metric may be particularly beneficial if all events include metadata with measurable data. As an example, communication application event records may include a property for call duration, call quality, amount of data used, and/or other suitable metrics. Measuring platform interactions may additionally involve updating several measurements. For example, a count of events and an average value of a particular event property (e.g., quality score) could be measured.

Block S250, which includes providing access to measured platform interactions through an application programming interface, functions to enable account users to build interactions through an interface. A tracker resource is preferably made accessible as an API resource. Writing to the API resource can update or change the state of the tracker resource. Reading from the API resource can enable access to the measured usage associated with the tracker. An account holder can poll the tracker resource and build external logic in an application based on that information. The measured usage associated with a tracker resource can additionally be presented through a user interface. One potential use of data of a tracker resource is with analytics by an account holder. The analytics can be presented to users as charts, graphs, tables, and other suitable data infographics.

Additionally or alternatively, the method can include creating a usage trigger conditionally activated by a tracker S260, which functions to use trackers in the conditions of a trigger resource. The integration of trigger resources with a method involving tags and tracking resources may additionally include receiving a trigger configuration from an account, wherein the received trigger configuration includes a callback uniform resource identifier and a trigger condition based on the tracking resource; monitoring the tracking resource in the context of the associated trigger configuration; and processing the trigger, wherein processing the trigger comprises transmitting a request to the callback uniform resource identifier of an application server upon the tracking resource satisfying the trigger condition of the associated trigger. A trigger resource can preferably be created by an account holder in a manner substantially similar to above. In place of or in addition to a counter, a trigger resource can depend on at least one tracker resource. The triggers can similarly include a defined callback URI and/or a platform action. The trigger can function substantially similar to the triggers described above. However, the triggers can be configured to react to events tracked through customize tagging and tracking. The trigger can similarly message a callback URI. Communicating with a callback URI can involve similar security measures as described above.

The usage trigger can alternatively invoke an internal action. The internal action may include actions not otherwise permitted to an account such as immediate communication session suspension, account suspension, endpoint usage suspension, or other suitable actions.

In one variation, the method may apply block S260 in place of or in addition to block S250. In another variation, the process of using counters may be used in combination with tags and triggers without a defined tracking resource. In this variation, a counter functions as a special case counter wherein the counter measures platform interactions based on events with one defined tag. Blocks S210 and S220 are preferably used in combination with processes of method S100, wherein the counter is configured to count events with a particular set of tags.

In one application of the method, tags may be used by an account holder to provide multitenant experiences to users of the account holder's system. The method may include the tag identifiers being associated with a unique identifier of sub-accounts of an account; and measuring accumulated credit of platform usage broken down by tags. An account holder supplying the tags preferably facilitates tagging platform interactions with an associated sub-account of that account during block S210. Measuring accumulated credit is preferably applied during block S240. Preferably the price of various events is indicated in the event records. For example, ending a call will result in the price of the call being recorded in the call event log. As one exemplary scenario, a third party app using the communication platform may allow users to make phone calls from the third party app. In this example, the third party app may represent an account of the communication platform and the user may represent a sub-account segment of the account. The use of tags may be used to handle subaccounts, when subaccounts are not enabled in the platform or the use scenario doesn't lend itself well to a sub-account model. If the third party app manages a handful of phone numbers of which all the users share, then it may be hard to otherwise breakup use of the platform into distinct sub-accounts in the platform. The billing or crediting of an account may be all attributed to the third party app account on the communication application. The method may be applied to allow billing to be divided between the users of the third party application. The third party app preferably tags all interactions with the communication platform using a user identifier created within their application. Then, the tags are leveraged to breakdown platform usage so that usage can be attributed to distinct user accounts. In one variation, a tracking resource is setup for each user identifying tag, and used to measure the accrued bill for each user of the third party app. The third party app can query the measured bill or credit for a tag, and then charge the appropriate end user. In another variation, an event trigger may be used to automatically redirect billing of the account to the end users. A triggered event may be used to execute a billing event for given segment of usage within an account. The tags, trackers, and/or triggers may alternatively be used in any suitable manner.

The system and method of the preferred embodiment and variations thereof can be embodied and/or implemented at least in part as a machine configured to receive a computer-readable medium storing computer-readable instructions. The instructions are preferably executed by computer-executable components preferably integrated with the tagging engine, tracking engine, and/or the triggering engine of an application platform. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
an application platform system generating a first tracking resource for a first platform account, wherein the first tracking resource is associated with a first usage-instance identifier for platform interaction of the application platform system during processing for a first usage instance, and wherein the first tracking resource is accessible by an external application server of the first account via the Internet;
the application platform system performing processing for the first usage instance for the first platform account and generating a plurality of logged events for the first usage instance;
the application platform system tagging each logged event for the first usage instance with the first usage-instance identifier;
the application platform system receiving a request for event information tagged with the first usage-instance identifier from the external application server via the Internet; and
the application platform system providing the event information tagged with the first usage-instance identifier to the application server via the Internet.

2. The method of claim 1, wherein the first usage instance is an API call.

3. The method of claim 1, wherein the first usage instance is a call session.

4. The method of claim 1, wherein the first usage instance is a messaging session.

5. The method of claim 1, wherein the tagged events include events generated by a plurality of services of the application platform system.

6. The method of claim 2, wherein the application platform system generates the first tracking resource responsive to a request provided by the application server via the Internet.

7. The method of claim 1, wherein the application platform system detects the first usage-instance identifier from metadata of a platform instruction for the first usage instance, wherein the platform instruction is received from the application server.

8. The method of claim 1, wherein the application platform system obtains the first usage-instance identifier from an auto-tagging rule configuration.

9. The method of claim 1, wherein the application platform system detects the first usage-instance identifier from at least one of: an application programming interface (API) request received from the application server, and an application instruction that specifies a usage-instance identifier variable.

10. An application platform system comprising:
a plurality of services; and
a tagging and tracking system,
wherein the tagging and tracking system is constructed to generate a first tracking resource for a first platform account, wherein the first tracking resource is associated with a first usage-instance identifier for platform interaction of the application platform system during processing for a first usage instance by at least one of the plurality of services, and wherein the first tracking resource is accessible by an external application server of the first account via the Internet,
wherein the plurality of services is constructed to perform processing for the first usage instance for the first platform account and generate a plurality of logged events for the first usage instance, wherein the tagging and tracking system is constructed to tag each logged event for the first usage instance with the first usage-instance identifier, wherein the tagging and tracking system is constructed to receive a request for event information tagged with the first usage-instance identifier from the external application server via the Internet, and wherein the tagging and tracking system is constructed to provide the event information tagged with the first usage-instance identifier to the application server via the Internet.

11. The system of claim 10, wherein the first usage instance is an API call.

12. The system of claim 10, wherein the first usage instance is a call session.

13. The system of claim 10, wherein the first usage instance is a messaging session.

14. The system of claim 10, wherein the tagged events include events generated by the plurality of services.

15. The system of claim 10, wherein the tagging and tracking system is constructed to generate the first tracking resource responsive to a request provided by the application server via the Internet.

16. The system of claim 10, wherein the application platform system is constructed to detect the first usage-instance identifier from metadata of a platform instruction for the first usage instance, wherein the platform instruction is received from the application server.

17. The system of claim 10, wherein the application platform system is constructed to obtain the first usage-instance identifier from an auto-tagging rule configuration.

18. The system of claim 10, wherein the application platform system is constructed to detect the first usage-instance identifier from at least one of: an application programming interface (API) request received from the application server, and an application instruction that specifies a usage-instance identifier variable.

* * * * *

UNITED STATES PATENT AND TRADEMARK OFFICE
CERTIFICATE OF CORRECTION

PATENT NO. : 10,176,026 B2
APPLICATION NO. : 15/926381
DATED : January 8, 2019
INVENTOR(S) : Milliron et al.

Page 1 of 1

It is certified that error appears in the above-identified patent and that said Letters Patent is hereby corrected as shown below:

In the Claims

In Column 22, Line 34, in Claim 6, delete "claim 2," and insert --claim 1,-- therefor Signed and Sealed this
Fifth Day of May, 2020

Andrei Iancu
*Director of the United States Patent and Trademark Office*